United States Patent [19]

Heydrich

[11] 4,179,892
[45] Dec. 25, 1979

[54] INTERNAL COMBUSTION ENGINE WITH EXHAUST GAS RECIRCULATION

[75] Inventor: Hans Heydrich, Columbus, Ind.

[73] Assignee: Cummins Engine Company, Inc., Columbus, Ind.

[21] Appl. No.: 864,811

[22] Filed: Dec. 27, 1977

[51] Int. Cl.² .............................................. F02B 37/00
[52] U.S. Cl. .................................................... 60/605
[58] Field of Search ......................... 60/602, 603, 605; 123/119 A

[56] References Cited

U.S. PATENT DOCUMENTS

| | | | |
|---|---|---|---|
| 1,910,279 | 5/1933 | Buchi | 60/605 |
| 2,730,861 | 1/1956 | Buchi | 60/605 |
| 3,149,454 | 9/1964 | Hahn | 60/603 X |
| 3,383,092 | 5/1968 | Cazier | 60/605 X |
| 3,776,207 | 12/1973 | Simko | 123/119 A |

*Primary Examiner*—Michael Koczo
*Attorney, Agent, or Firm*—Merriam, Marshall & Bicknell

[57] ABSTRACT

This disclosure relates to a turbocharged internal combustion engine. The exhaust manifold of the engine is divided into sections, and the engine exhaust from one of the sections is recirculated to the intake manifold. The engine cylinders that feed the EGR exhaust manifold section alternate in the engine firing order with the other cylinders, thereby providing a substantially uniform flow of exhaust gas to all of the cylinders. The turbine of the engine turbocharger is divided into two sections, one having a smaller flow area than the other. The turbine section having the smaller flow area is connected to receive the exhaust gasses from the exhaust manifold section that also supplies the EGR.

12 Claims, 1 Drawing Figure

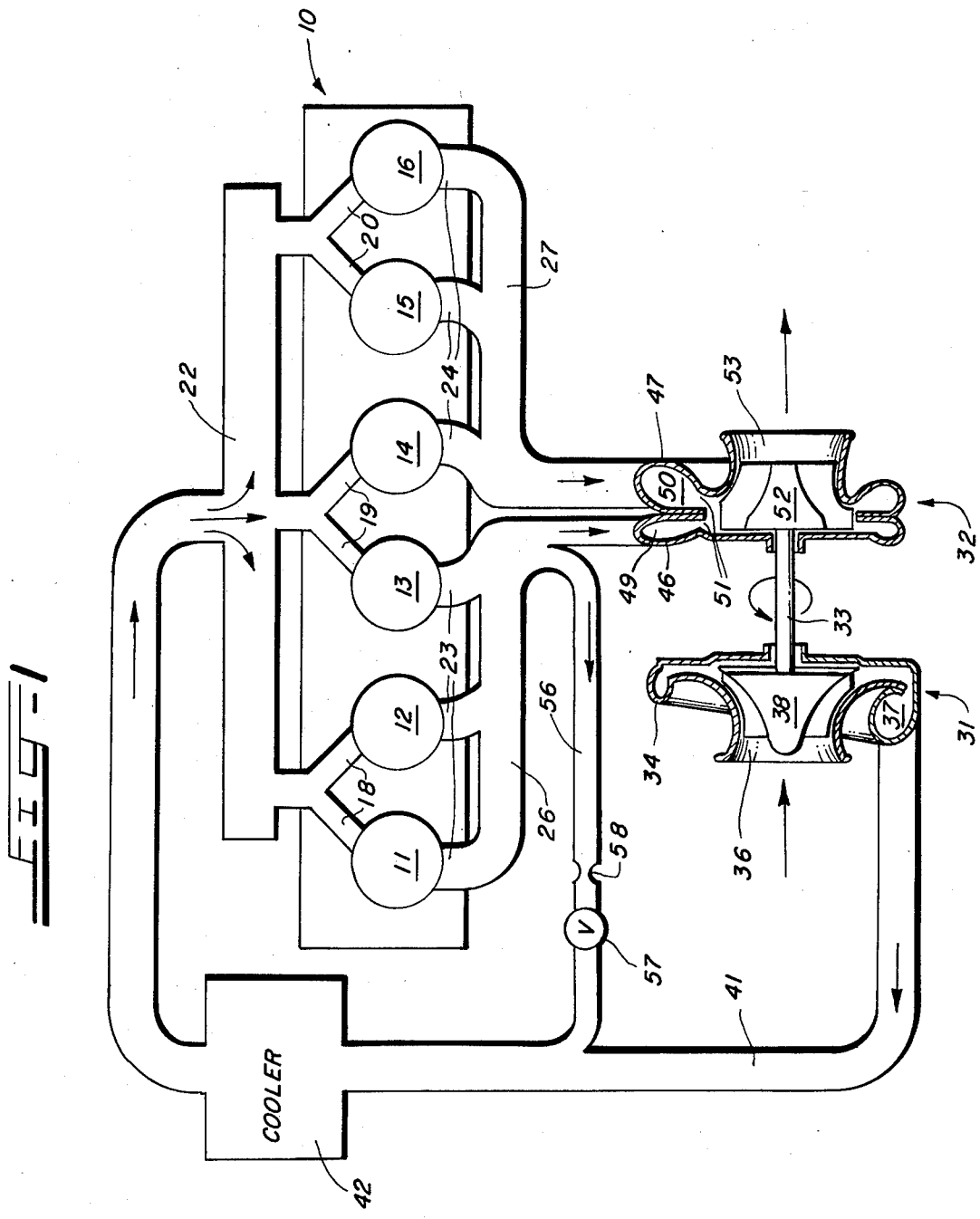

INTERNAL COMBUSTION ENGINE WITH EXHAUST GAS RECIRCULATION

BACKGROUND OF THE PRIOR ART

It has become common practice in recent years to provide an exhaust gas recirculation (EGR) system in an internal combustion engine, in order to reduce the emission of noxious gases. Such systems have been included in turbocharged engines, and U.S. Pat. Nos. 3,149,454, 3,914,944 and 3,925,989 show examples of such arrangements. Systems of this character have included an EGR line connecting the engine exhaust manifold with the intake manifold.

For such an EGR system to work in a turbocharged engine where the EGR line is connected between the exhaust and intake manifolds, the pressure in the exhaust manifold must be higher than the pressure in the intake manifold in order to produce the desired flow toward the intake manifold. This means that high efficiency turbochargers which are capable of operating with the exhaust manifold pressure lower than intake manifold pressure cannot be used and the engine fuel comsumption is thereby compromised.

An engine may be constructed including an EGR line connected to receive exhaust gases from less than all of the cylinders (EGR pumping cylinder), but this may also prove to be disadvantageous because the exhaust gases may not be recirculated and evenly distributed to the intakes of all of the cylinders. For example, if the entire exhaust flow from one cylinder were recirculated, the one or two cylinders whose intake strokes are next in the firing order would receive most of the recirculated gas.

Another disadvantage of the proposal whereby the exhaust gases from a group of cylinders is directed in part to the intake manifold with the remaining part directed to the turbocharger turbine is that, to make the exhaust manifold pressure greater than the intake manifold pressure, it is proposed to place a valve or orifice in the duct from the EGR pumping cylinders to the turbocharger in order to increase the back pressure on the EGR pumping cylinders and produce the desired EGR rate. Such an arrangement has the disadvantage of increasing the piston pumping work penalty of the EGR pumping cylinders, and thereby producing energy losses.

It is a general object of the present invention to eliminate the foregoing problems by providing an engine including improved EGR system.

BRIEF SUMMARY OF THE INVENTION

Apparatus in accordance with the present invention comprises an internal combustion engine including a turbine-compressor unit, an intake manifold, and an exhaust manifold. The compressor outlet is ducted to the intake manifold. The exhaust manifold is divided into two sections and each section is connected to receive the exhaust of a set of cylinders. The turbine includes two sections and each turbine section is connected to receive the exhaust from one of the two exhaust manifold sections. An EGR line is connected to receive exhaust from one of the sets of cylinders and to duct such exhaust to the intake manifold.

The cylinders of one of the sets alternate in the engine firing order with the cylinders of the other set. The turbine section connected to the exhaust manifold section and to the EGR line, has a restricted flow area through it, which increases the pressure in this manifold section to a value which is above the pressure in the intake manifold.

The foregoing and other objects and advantages of the present invention will become more apparent from the following detailed description taken in conjunction with the single FIGURE of the drawing, which schematically illustrates an engine incorporating the present invention.

DETAILED DESCRIPTION

In the specific example illustrated and described herein, the engine is a six cylinder compression-ignition, or diesel, engine. It should be understood, however, that the invention is also applicable to other types of engines and to engines having a larger or smaller number of cylinders. The engine includes a block and head 10 having six cylinders, 11, 12, 13, 14, 15 and 16 therein. In a six cylinder engine of this character, the firing order of the cylinders is normally 11-15-13-16-12-14. The block-head 10 further includes a plurality of intake passages 18, 19 and 20 which are connected to receive intake air from an air intake manifold 22. The block-head 10 further has exhaust passages 23 connected to receive the exhaust of the cylinders 11, 12 and 13, and exhaust passages 24 connected to receive the exhaust from the cylinders 14, 15 and 16. The engine further includes an exhaust manifold including a section 26 which is connected to receive the exhaust from the passages 23 and another section 27 which is connected to receive the exhaust from the passages 24. The two exhaust manifold sections 26 and 27 are separated as shown in the drawing so that the exhaust from the cylinders 11, 12 and 13 does not mix, in the exhaust manifold, with the exhaust from the cylinders 14, 15 and 16.

The engine further includes a turbine-compressor unit comprising a compressor 31 and a turbine 32 which are connected by a shaft 33. The compressor 31 includes a compressor casing or housing 34 which may have a standard configuration. The casing 34 includes a centrally or axially located air intake opening 36 and a scroll 37 which receives air from the intake opening 36 and delivers the air to an outlet of the casing 34. A rotor 38 is rotatably mounted in the casing 34 and moves the air from the intake opening 36 to the outlet of the casing when it is driven by the shaft 33. The outlet of the casing 34 is connected by a duct 41 to the intake manifold 22. A cooler 42 is preferably connected in the duct 41 between the compressor 31 outlet and the intake manifold 22 in order to cool the intake air before it reaches the manifold 22. Actually, as will be described hereinafter, a portion of the exhaust is also fed to the intake manifold 22 and the cooler 42 serves to reduce the temperature of the fresh air-exhaust gas mixture. Of course, other cooling arrangements to cool either the charge air only or the exhaust gas only, or the mixture, could also be used.

The turbine 32 includes two turbine inlet sections 46 and 47 which, in the present illustration, are combined in a single turbine casing. The casing of the turbine and the rotor may, for example, be of the character illustrated and described in the Neff U.S. Pat. No. 3,614,259, wherein the turbine casing 48 is divided into two scrolls 49 and 50. The scroll 49 is connected to receive exhaust gases from the manifold section 26 and the scroll 50 is connected to receive exhaust gases from the manifold section 27. The two scrolls 49 and 50 are connected to passages or nozzles 51 which direct the exhaust to the outer periphery of a rotor 52 of the turbine 32, the rotor 52 being common to the two turbine sections. The exhaust gases exit from the turbine through an exit opening 53. As previously mentioned, the shaft 33 connects the rotor 52 of the turbine with the rotor 38 of the compressor 31, and the turbine of course drives the compressor during operation of the engine.

Apparatus in accordance with the invention further includes an exhaust gas recirculation (EGR) line or duct 56 which conducts exhaust from the manifold section 26 to the duct 41. In the present specific example, the line 56 leads from the outlet of the exhaust manifold section 26 and connects to the duct 41 between the compressor 31 and the cooler 42. Thus, gases from the manifold section 26 mix with the fresh air leaving the compressor 31, and the exhaust-fresh air mixture flows through the cooler 42 where the mixture is cooled, and then the mixture flows to the intake manifold 22 where it is distributed evenly to the intakes of the six cylinders.

A valve 57 is preferably connected in the line 56 which may be used to turn the EGR line on and off as desired. The valve 57 may be used to close the EGR line 56 in order to accelerate the turbocharger rotor, and the valve 57 may be used to adjust or control the rate or amount of exhaust which is recirculated. An orifice 58 may also be provided in the line 56 in order to regulate the amount of gas recirculated.

Further, the turbine section 46 has a smaller gas flow area through it as compared with the flow area through the manifold section 47. Due to the smaller flow area through the section 46, the pressure in the manifold section 26 will be higher than the pressure in the section 27. The flow area of the turbine section 46 is also sized to make the pressure in the manifold section 26 higher than the pressure in the duct 41 leading from the outlet of the compressor 31. Because of the higher pressure in the manifold section 26, the exhaust gases will flow from the section 26, through the EGR line 56 and into the duct 41. This higher pressure also makes the pumping energy losses of the three EGR pumping cylinders 11, 12 and 13 higher than the losses for the three cylinders 14, 15 and 16, but this increased energy loss will be at least partially regained by the work output of the turbine 32.

As mentioned above, the smaller flow area of the turbine section 46 produces the relatively high pressure in the section 26 as compared with the section 27. This smaller flow area in the section 26 may be produced by the design of the turbine nozzles 51 or by reducing the flow area of the scroll 49 as illustrated in the drawing and described herein. It is evident that instead of the radial inflow turbine type depicted in this FIGURE, mixed flow or axial flow type turbines could be employed for this invention simply by dividing the inlet casings and nozzle assemblies into two sections having appropriate flow areas.

An internal combustion engine having a turbine-compressor unit in an exhaust gas recirculation arrangement as illustrated and described has numerous advantages. The exhaust gases from the EGR pumping cylinders 11, 12 and 13 are evenly distributed to the intake passages 18, 19 and 20 of the six cylinders. This is due to the fact that the cylinders of the set including cylinders 11, 12 and 13 alternate in the engine firing order with the set of cylinders 14, 15 and 16. Consequently, bursts of exhaust gases will flow through the EGR line 56 at regularly spaced intervals during each cycle of operation of the engine. By providing the reduced flow area through the turbine casing section 46 connected to the EGR pumping cylinders, the pressure in the EGR manifold section 26 is high as compared with the pressure in the duct 41, thereby producing the flow of the exhaust gases and its mixture with the fresh air. Because of this higher pressure in the manifold section 26, it is possible to use a higher efficiency turbine-compressor unit. Even though the EGR manifold section 26 has a higher pressure and, therefore, the EGR pumping cylinders have greater pumping energy losses, this increased pumping energy loss is regained or at least partially recovered by the power produced by the turbine 32.

I claim:

1. In an internal combustion engine including a plurality of cylinders and an intake manifold connected to supply air to said cylinders, the improvement comprising an exhaust manifold divided into first and second sections, said first section being connected to receive exhaust gases from a set of EGR pumping cylinders and said second section being connected to receive exhaust gases from the remaining set of cylinders, an EGR line connected to conduct exhaust gases from said first exhaust manifold section to said intake manifold, a turbine-compressor unit including a compressor connected to supply air to said intake manifold, and a turbine divided into first and second sections, said first turbine section being connected to receive exhaust gases from said first exhaust manifold section and said second turbine section being connected to receive exhaust gases from said second exhaust manifold section, and said first turbine section having a smaller flow area than said second turbine section and thereby increasing the pressure in said first manifold section to above the pressure in said intake manifold.

2. Apparatus as in claim 1, wherein each of said turbine sections has a scroll, and said first turbine section has a smaller scroll than said second turbine section, thereby providing said smaller flow area.

3. Apparatus as in claim 1, and further including a flow restriction in said EGR line.

4. Apparatus as in claim 3, wherein said restriction comprises an orifice.

5. Apparatus as in claim 3, wherein said restriction comprises a valve.

6. Apparatus as in claim 1, wherein said first set of EGR pumping cylinders alternate in the engine firing order with the cylinders of said second set.

7. In an internal combustion engine including a plurality of cylinders and an intake manifold connected to supply air to said cylinders, the improvement comprising an exhaust manifold divided into first and second sections, said first section being connected to receive exhaust gases from a set of EGR pumping cylinders and said second section being connected to receive exhaust gases from the remaining set of cylinders, an EGR line connected to conduct exhaust gases from said first exhaust manifold section to said intake manifold, a turbine-compressor unit including a compressor connected to supply air to said intake manifold, and a turbine divided into first and second sections, said first turbine section being connected to receive exhaust gases from said first exhaust manifold section and said second turbine section being connected to receive exhaust gases from said second exhaust manifold section, said first set of EGR pumping cylinders alternating in the firing order with the cylinders of said second set.

8. An internal combustion engine comprising a plurality of cylinders, an intake manifold connected to supply air to said cylinders, an exhaust manifold divided into first and second sections, said first section being connected to receive exhaust gases from a set of EGR pumping cylinders and said second section being connected to receive exhaust gases from the remaining set of cylinders, an EGR line connected to conduct exhaust gases from said first exhaust manifold section to said intake manifold, a turbine-compressor unit including a compressor connected to supply air to said intake manifold, and a turbine divided into first and second sections, said first turbine section being connected to receive exhaust gases from said first exhaust manifold section and said second turbine section being connected to receive exhaust gases from said second exhaust manifold section, and said first turbine section having a smaller flow area than said second turbine section and thereby increasing the pressure in said first manifold section to above the pressure in said intake manifold.

9. An engine as in claim 8, wherein the cylinders of said first set alternate in the firing order with the cylinders of said second set.

10. The combination comprising an internal combustion engine having a plurality of combustion chambers including a set of EGR pumping chambers, an intake manifold connected to supply intake air to said chambers, an EGR exhaust manifold connected to supply intake air to said chambers, an EGR exhaust manifold section connected to receive exhaust gases from said EGR pumping cylinders, an EGR line connecting said EGR exhaust manifold section with said intake manifold for recirculation of exhaust gases during operation in at least the working range of the engine, a turbine-compressor unit including a turbine having at least two sections, one of said turbine sections being connected to receive exhaust from said EGR exhaust manifold section and the other of said turbine sections being connected to receive exhaust from the remainder of said plurality of combustion chambers, said unit further including a compressor connected to supply intake air to said intake manifold, and said one turbine section having a flow area which produces higher pressure in said EGR exhaust manifold section than in said intake manifold section.

11. The combination comprising an internal combustion engine having a plurality of combustion chambers including a set of EGR pumping chambers, an intake manifold connected to supply intake air to said chambers, an EGR exhaust manifold section connected to receive exhaust gases from said EGR pumping cylinders, an EGR line connecting said EGR exhaust manifold section with said intake manifold, a turbine-compressor unit including a turbine having at least two sections, one of said turbine section being connected to receive exhaust from said EGR exhaust manifold section and the other of said turbine sections being connected to receive exhaust from the remainder of said plurality of combustion chambers, said unit further including a compressor connected to supply intake air to said intake manifold, and said one turbine section having a flow area which produces higher pressure in said EGR exhaust manifold section than in said intake manifold section, said one turbine section having a smaller flow area than the remainder of said turbine sections.

12. The combination of claim 11, wherein the set of EGR pumping chambers fire at generally regularly spaced intervals in the cycle of the engine.

* * * * *